US006484079B2

(12) United States Patent
Buckelew et al.

(10) Patent No.: US 6,484,079 B2
(45) Date of Patent: Nov. 19, 2002

(54) METHODS AND SYSTEMS FOR REMOTELY MONITORING SENSOR DATA IN DELIVERY VEHICLES

(75) Inventors: Richard A. Buckelew, Bradenton, FL (US); Ken Goff, Sarasota, FL (US)

(73) Assignee: RMC Industries Corporation, Decatur, GA (US)

( * ) Notice: Subject to any disclaimer, the term of this patent is extended or adjusted under 35 U.S.C. 154(b) by 0 days.

(21) Appl. No.: 09/834,545

(22) Filed: Apr. 13, 2001

(65) Prior Publication Data

US 2002/0032517 A1 Mar. 14, 2002

Related U.S. Application Data

(60) Provisional application No. 60/200,221, filed on Apr. 28, 2000, and provisional application No. 60/260,539, filed on Jan. 9, 2001.

(51) Int. Cl.$^{7}$ .................................................. G06F 7/00

(52) U.S. Cl. ........................... 701/29; 701/36; 340/439; 340/902; 366/1

(58) Field of Search .............................. 701/29, 32, 34, 701/35–36, 207, 213–216; 340/425.5, 438, 439, 901, 902, 904; 342/357.01, 357.06, 357.07, 357.08, 357.09, 357.13; 366/1, 2, 17

(56) References Cited

U.S. PATENT DOCUMENTS

| | | | |
|---|---|---|---|
| 2,089,604 A | | 8/1937 | Hagy |
| 3,731,909 A | | 5/1973 | Johnson |
| 4,008,093 A | | 2/1977 | Kitsuda et al. |
| 4,097,925 A | | 6/1978 | Butler, Jr. |
| 4,804,937 A | | 2/1989 | Barbiaux et al. |
| 4,900,154 A | | 2/1990 | Waitzinger et al. |
| 5,475,597 A | | 12/1995 | Buck |
| 5,719,771 A | | 2/1998 | Buck et al. |
| 5,918,180 A | | 6/1999 | Dimino |
| 6,141,610 A | * | 10/2000 | Rothert et al. ................ 701/35 |

FOREIGN PATENT DOCUMENTS

| | | |
|---|---|---|
| WO | WO 95/15437 | 6/1995 |

* cited by examiner

*Primary Examiner*—Gertrude Arthur
(74) *Attorney, Agent, or Firm*—Alston & Bird LLP

(57) ABSTRACT

A system for monitoring and reporting sensor data associated with the delivery of concrete from a provider site to a client site by a concrete delivery mixing truck having a status sensor capable of obtaining slump related data is provided. The status sensor obtains slump related data which is read by a computing device that calculates a slump value, compares the slump value to a delivery slump value, and indicates that a transmission event has occurred if a difference between the delivery slump value and the calculated slump value exceeds a tolerance level. If a transmission event has occurred, event data associated with the transmission event is collected and delivered to a remote location or device.

11 Claims, 4 Drawing Sheets

METHODS AND SYSTEMS FOR REMOTELY MONITORING SENSOR DATA IN DELIVERY VEHICLES

CROSS REFERENCE TO RELATED APPLICATIONS

This application claims benefit of U.S. Provisional Application No. 60/200,221, entitled "Methods and Systems for Remotely Monitoring Delivery Data in Delivery Vehicles," filed Apr. 28, 2000. This application also claims benefit of U.S. Provisional Application No. 60/260,539, entitled "Methods and Systems for Remotely Monitoring Delivery Data in Delivery Vehicles" filed Jan. 9, 2001.

FIELD OF THE INVENTION

The present invention relates to delivery vehicles and particularly to delivery vehicles that deliver construction materials. In particular, the present invention relates to the remote monitoring and reporting of sensor data using intelligent resources associated with the delivery vehicle.

BACKGROUND OF THE INVENTION

Numerous problems are associated with the delivery of construction materials from a provider site to a client site. Although the construction materials are normally prepared carefully at the provider site, materials providers have no reliable means for accurately monitoring the materials during delivery or for determining the status of a particular delivery. This is particularly true in the context of ready-mix concrete delivery. It is common practice to mix the concrete at a provider site and to use mobile concrete delivery mixing trucks to deliver the concrete to a client site where the concrete may be required. Generally, the particulate concrete ingredients are loaded at a provider site that mixes the concrete ingredients according to a predefined recipe that yields concrete appropriate for the desired use.

An important aspect of the mixing process is to control the amount of water added to the concrete mixture. It is known that, if concrete is mixed with excess liquid component, the resulting concrete mix does not dry with the required structural strength. It is also known that the consistency of the concrete mixture may be measured by measuring the slump of the concrete mixture. Accordingly slump tests have been devised so that a sample of the concrete mix can be tested with a slump test prior to actual usage on site. It is also known to install slump sensors onto the concrete mixing trucks that measure the slump of the concrete mixture by monitoring the torque loading on the hydraulic drive which rotates the mixing barrel affixed to the truck. Thus, it is now possible to prepare a concrete mixture with ingredients specially chosen to provide a desired slump.

The slump is chosen based on the particular application to insure that the concrete provides the required strength level, durability, and level of quality for the application. Concrete providers have therefore gone to great lengths to prepare the concrete mixture to insure that these goals are met. A problem arises, however, when the mixing trucks leave the dispatch center and carry the mixture to the site because the concrete providers cannot monitor the slump consistency during transport and after delivery. Often, the mixture is altered after it leaves the dispatch center by adding water to reduce the slump. Although this makes it easier to spread and smooth the mixture, it compromises the quality and integrity of the concrete and leads to structural instability, cracks in the concrete's surface, discoloration and other undesired defects. This commonly results in disputes between the concrete provider and the client as to whom is responsible for the structural shortcomings. The concrete provider can only state that the concrete mixture was proper when it was shipped, but cannot account for the mixture during transport or unloading. Although existing methods enable the delivery driver to manually read and record the slump of the concrete mixture, it is often difficult to rely on manual recordings because the driver may forget or be persuaded to report inaccurate data.

Several attempts have been made to provide greater control over the concrete mixture after it leaves the provider site. For example, concrete providers have implemented programs to educate the concrete mixing truck drivers about the effects of adding water and other elements to the concrete mixture at the site. The problem persists, however, because the foremen at the delivery site often demand that water be added to ease the installation process. The delivery drivers are often persuaded to comply with these demands and, in many instances, not to report that the mixture was altered. Thus, there is an unsatisfied need for a way to monitor and control the composition of the concrete mixture, particularly the slump, during delivery and unloading.

Another problem apparent in the delivery of concrete products and other construction materials is the inability to monitor and report the status of various deliveries. Current systems track materials delivery by having the delivery driver communicate delivery status directly back to the dispatch site. This approach is problematic because the delivery drivers may not be precise or may misrepresent the actual status in order to hide their own mistakes. Human error also occurs resulting in inaccurate delivery records.

Recent developments in Global Positioning Systems have provided another means to track the location of delivery vehicles. These systems allow the dispatch center to locate the position of the delivery trucks. Based on the positioning data, the dispatch center may be able to determine whether the truck has arrived at the site location or the approximate time it will take the truck to arrive. Although the GPS's provide a better solution to tracking truck location, they provide no data whatsoever concerning the status of the actually delivery or of the status of the goods being delivered. For example, the vehicle may have arrived at the site and been unable to deliver the materials or goods. Thus, the GPS may indicate that the truck is en route back to the provider site, but it cannot inform the dispatch center if the goods were delivered. Obviously, these systems can be supplemented with radio communications or other manually implemented status updates, but this introduces human error and unreliability.

In large companies with numerous delivery vehicles, there is also a problem with monitoring and sifting through the large volume of data provided by existing systems such as those where delivery status is manually communicated to the dispatch center by the driver. As data for each vehicle is delivered to the dispatch center, some means must be provided to sift through the data to determine the status of the various deliveries and identify any problems in the delivery. Closely linked to this problem are the transaction costs resulting from the transmission of status updates to the dispatch center. Regardless of the method used, the costs of constantly updating the delivery status can be quite large. In systems that provide for periodic updates, there may also be limited bandwidth available for such transmissions. Thus, there is a need for a system that provides pertinent delivery status information but does not provide excessive information that overwhelms the dispatch center and requires unnecessary transmission costs.

SUMMARY OF THE INVENTION

The present invention addresses many of the problems previously encountered in the art by providing a system and method for remotely monitoring and reporting sensor data associated with a delivery vehicle. Advantageously, the data is collected and recorded at the delivery vehicle thus minimizing the bandwidth and transmission costs associated with transmitting data back to a dispatch center. The present invention enables the dispatch center to maintain a current record of the status of the delivery by monitoring the delivery data at the delivery vehicle to determine whether a transmission event has occurred. The transmission event provides a robust means enabling the dispatch center to define events that mark the delivery progress. When a transmission event occurs, the sensor data and certain event data associated with the transmission event are preferably transmitted to the dispatch center. Advantageously, this enables the dispatch center to monitor the progress and the status of the delivery without being overwhelmed by unnecessary information. Another advantage of the present invention is that it enables data concerning the delivery vehicle and the materials being transported to be automatically monitored and recorded such that an accurate record is maintained for all activity that occurs during transport and delivery.

According to one aspect of the present invention, a method is provided for remotely monitoring and reporting the status of a delivery to a client site using a delivery vehicle comprising a plurality of associated status sensors communicatively connected to a computing device. The method comprises obtaining sensor data from at least one of the plurality of status sensors and automatically monitoring the sensor data obtained from the status sensor using the computing device. The method further comprises determining whether a predefined transmission event has occurred based on the sensor data obtained from the status sensor and, in response to the occurrence of a transmission event, automatically delivering event data associated at least in part with the transmission event to a predetermined location or device. The event data preferable comprises information indicating the status of the delivery.

According to another aspect of the present invention, a system for monitoring and reporting sensor data associated with the delivery of construction material from a provider site to a client site by a delivery vehicle is provided. The system comprises a plurality of status sensors associated with the delivery vehicle, a communications device that receives and transmits data, and a computing device communicatively connected to the plurality of status sensors and the communications device. The computing device reads sensor data from at least one of the plurality of status sensors at a predetermined interval, monitors the data to determine whether a predefined transmission event has occurred and, in response to the occurrence of a transmission event, transmits event data associated with the transmission event indicating the status of the delivery to a predetermined location or device using the communication device.

In a preferred embodiment of the present invention, the delivery vehicle is a concrete delivery mixing truck that contains status sensors sufficient to read and monitor the slump of the concrete mixture in the mixing barrel. In this embodiment, a system for monitoring and reporting sensor data associated with the delivery of concrete from a provider site to a client site is provided. The system comprises a plurality of status sensors that collect sensor data associated with the concrete delivery mixing truck, including slump-related data. A computing device communicatively connected to the plurality of status sensors reads sensor data from the plurality of status sensors at a predetermined interval. A monitoring and reporting program associated with the computing device analyzes the sensor data, determines whether a transmission event has occurred and, in response to the occurrence of a transmission event, collects event data associated with the transmission event. A communications device communicatively connected to the computing device receives event data from the monitoring and reporting program in response to the occurrence of a transmission event and delivers the event data to a remote location or device.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
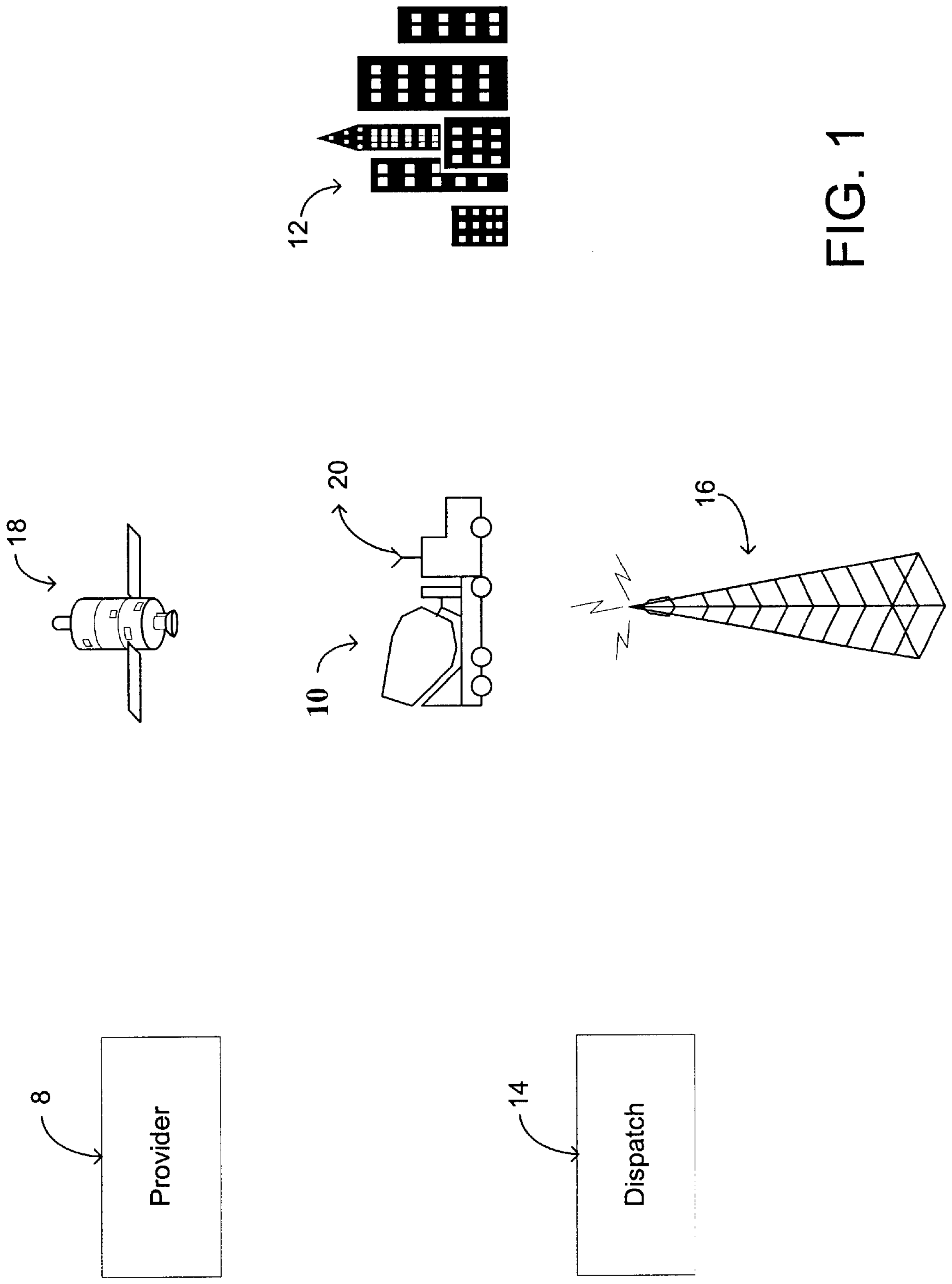
FIG. 1 shows a high-level representation of a delivery and communication system according to one aspect of the present invention.

FIG. 1 shows one embodiment of a general delivery and communication system according to the present invention. As shown in FIG. 1, a delivery vehicle 10 is used to pick up construction materials from a provider site 8 and deliver those materials to a client site 12. The delivery vehicle 10 communicates with a dispatch center 14 using a communications link 16 such that the dispatch center 14 is provided with certain information regarding the status of the delivery. Although the dispatch center 14 and provider site 8 are shown as separate elements, it will be understood that the dispatch center 14 and provider site 8 may be in the same location.

Figure 2:
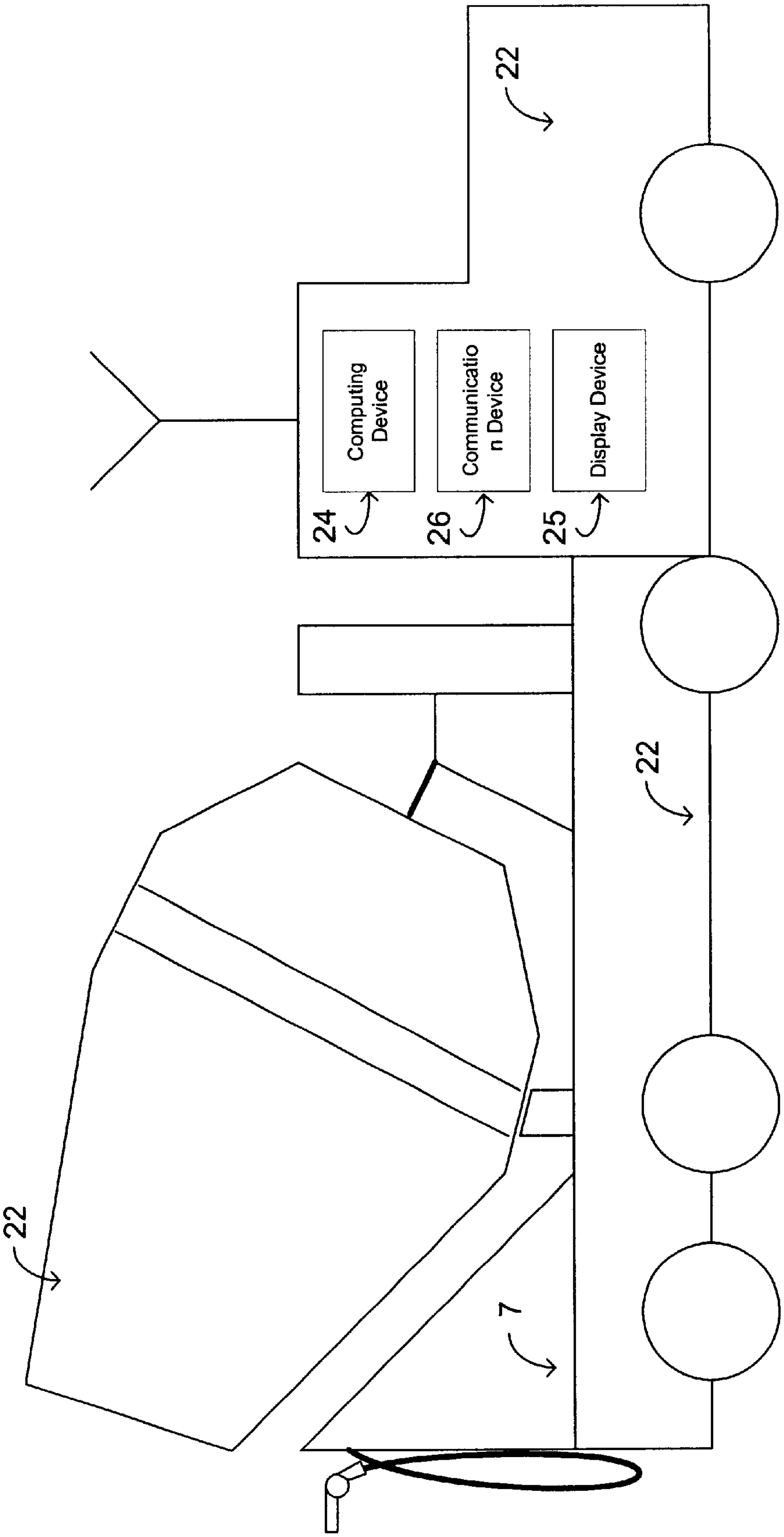
FIG. 2 is a side schematic view of a concrete delivery mixing truck in accordance with one embodiment of the present invention.

As shown in FIG. 2, the delivery vehicle 10 is equipped with one or more associated status sensors 22. The status sensors 22 collect sensor data concerning the delivery vehicle 10, such as its location, the status of the materials being delivered, and other data that may be relevant to the specific type of delivery vehicle 10 and the purpose of the delivery. An example of a status sensor is the GPS receiver 20 shown in FIG. 1. The GPS receiver 20 communicates with one or more GPS satellites 18 to determine the geographic location of the vehicle. Referring back to FIG. 2, the delivery vehicle 10 is also equipped with an associated computing device 24 and communications device 26. The computing device 24 reads the sensor data from the respective status sensors 22 and preferably stores the data in a memory device associated with the computing device 24. The computing device 24 also preferably stores information or profiles defining one or more transmission events on the memory device. Transmission events are defined by computer program logic running on the computing device 24 that instructs the computing device to read (and possibly process) one or more datum of the sensor data to determine whether certain predefined conditions are satisfied. If the predefined conditions are satisfied, a transmission event occurs. Upon the occurrence of a transmission event, the computing device 24 performs certain predefined actions associated with the transmission event by processing computer program logic (e.g., computer programming code) associated with the event. In a preferred embodiment, the computing device collects event data associated with the transmission event and stores the event data on a memory device associated with the computing device 24. The event data may comprise sensor data read from the status sensors, data derived from sensor data, data identifying the transmission event such as the type of event, time of occurrence etc., or any other data associated with the transmission event.

In a preferred embodiment, the occurrence of a transmission event prompts the computing device 24 to transmit the event data to a location remote from the delivery vehicle 10 such as the dispatch center 14 using the communications device 26. The communication device 26 may be any device capable of transmitting the event data from the delivery vehicle to a remote location. In a preferred embodiment, the communications device 26 is a radio modem and associated radio connected to the computing device 24. It will be recognized, however, that any wireless (such as cellular, Bluetooth, satellite, infrared, etc.) or wireline (serial cable, fiber optic cable, etc.) communications device may be used without altering the novel aspects of the present invention. If a wireline device is used, the computing device 24 will preferably contain a communications port that allows the wireline device to be connected to the communications device 26.

Figure 3:
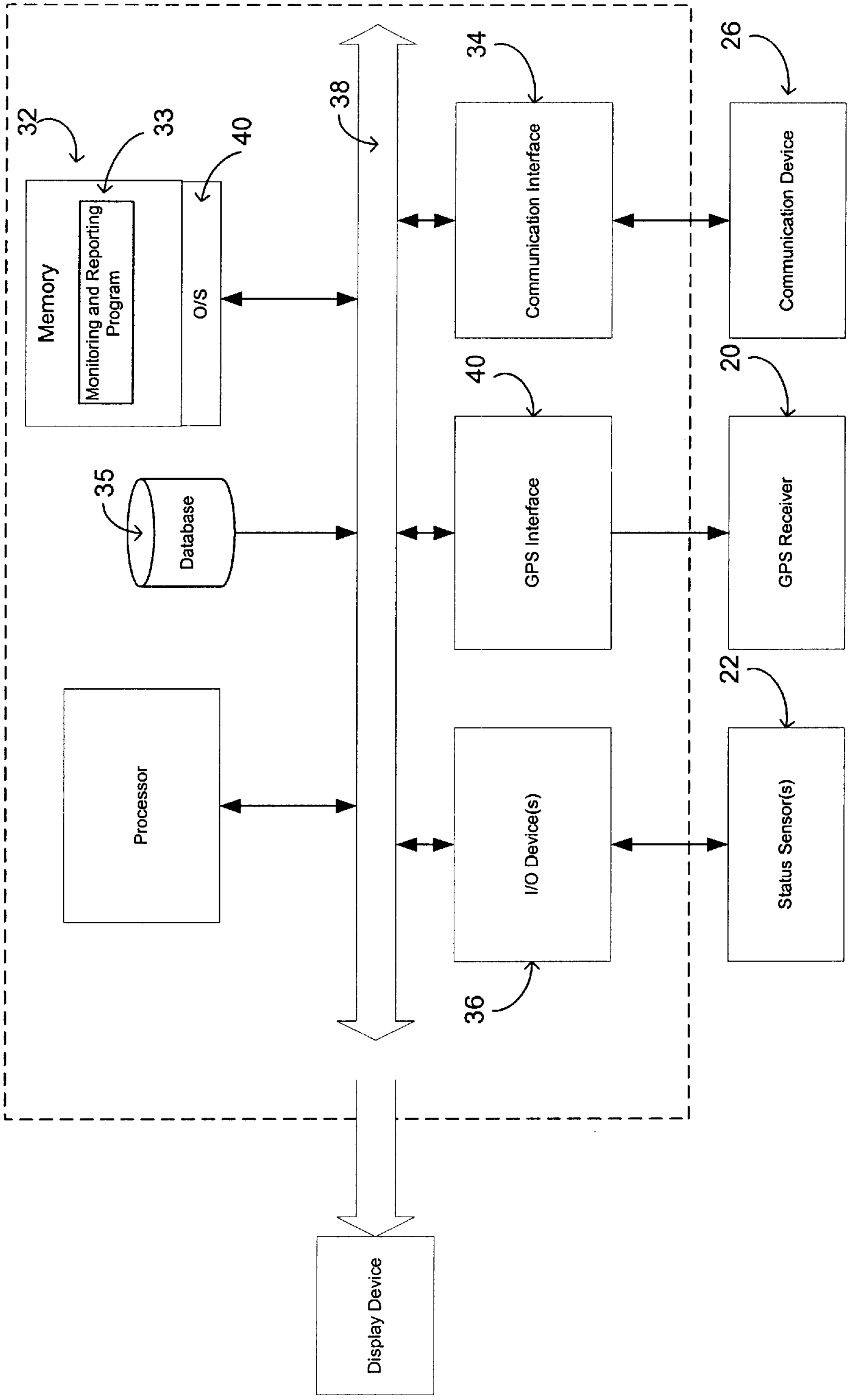
FIG. 3 is a high-level schematic representation of a computing device in accordance with one embodiment of the present invention.

FIG. 3 shows a block diagram of one possible configuration of the computing device 24 according to an embodiment of the invention. A central processing unit 30 communicates with an Input/Output (I/O) device 36 over the internal bus 38 to collect and send data to and from the status sensors 22. In a preferred embodiment the computing device 24 includes a memory 32 (either internal or external) that is associated with the computing device 24. The memory 32 preferably contains an operating system 40. The operating system 40 is preferably DOS based but any operating system capable of providing the functionality described herein may also be used. The memory 32 may also include a monitoring and reporting program 33 comprising computer logic defining one or more transmission events and the event data associated therewith. In addition, a memory device 35 preferably stores the sensor data read from the status sensors 22. The processor 30 also preferably communicates with a communication interface 34 over the bus 38. The communication interface 34 is adapted to facilitate communication between the computing device 24 and the communications device 26. The specific embodiment of the communications interface 34 may vary according to the type of communications device 26 that is employed.

In one embodiment, the processor also communicates with a separate GPS interface 40. The GPS interface 40 collects location data from the GPS receiver 20 providing the geographic location of the delivery vehicle 10. Although the GPS interface 40 and the I/O device 36 are shown as separate elements, the two elements may be combined into a single I/O board that facilitates the collection of all of the delivery data. The processor 30 may also communicate with one or more display devices 25 to display the sensor data and/or data associated with the occurrence of a transmission event.

Figure 4:
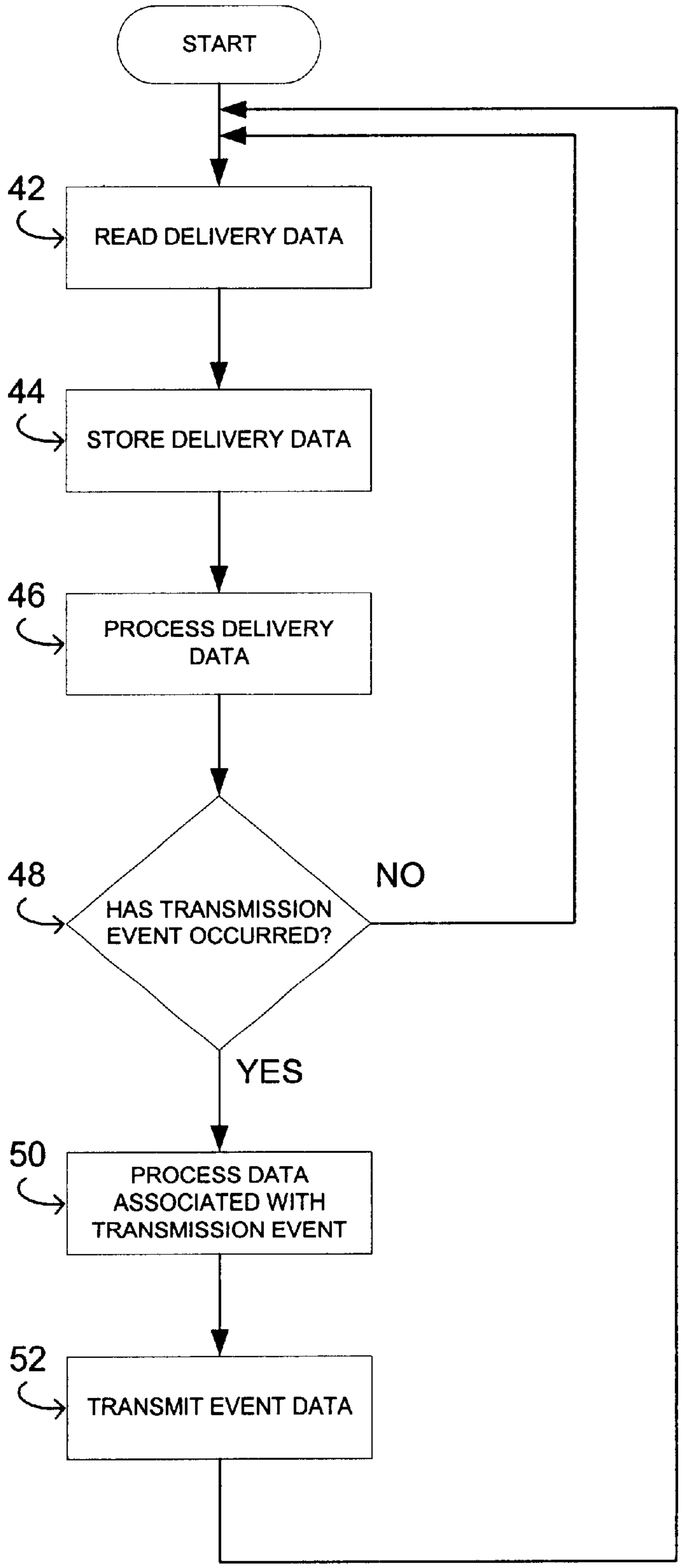
FIG. 4 is a flow diagram showing the operation a computing device in accordance with one aspect of the present invention.

FIG. 4 provides a high-level overview of the processing steps undertaken by the processor 30 to determine whether a transmission event has occurred according to one aspect of the present invention. In block 42 the processor 30 reads the sensor data from one or more of the status sensors 22 (such as the GPS receiver 20). In a preferred embodiment, the processor 30 stores the sensor data read from the status sensors 22 in the memory device 35, as illustrated by block 44. It should be noted, however, that the present invention does not require that the sensor data be stored prior to processing. Specifically, the sensor data may be stored in the memory 32. As shown in block 46, the processor 30 then processes the sensor data using predefined program logic of the monitoring and reporting program 33 that defines one or more transmission events and the steps that must be followed to determine whether a transmission event has occurred. The processor 30 then determines whether a transmission event has occurred, as shown in block 48. If no transmission event has occurred, the processor 30 returns to block 42 and continues to read the sensor data at predetermined intervals.

If the processor determines that a transmission event has occurred, it continues to block 50 and processes the computer program logic associated with the transmission event to collect/generate information concerning the transmission event such as the type of event, the sensor data associated with the event, and derived measurements calculated from the sensor data associated with the event (collectively the event data). Preferably, the processor 30 also sets a status flag within the memory device 35 that indicates that a particular transmission event has occurred and stores the event data in the memory device 35. In a preferred embodiment, the processor also communicates with the communications device 26 to deliver the event data to a remote location. Preferably, the communications device 26 is a wireless device such as a radio modem connected to the communications interface 34 of the computing device 24. In this embodiment, the event data is preferably transmitted to the dispatch center 14 to keep the dispatch center apprised of the occurrence of transmission events and delivery progress.

In a preferred embodiment, the event data transmitted to the dispatch center 14 also includes a record of the most recent sensor data received from one or more of the status sensors 22. This enables the dispatch center 14 to receive status updates regarding the delivery vehicle and the materials being delivered at predetermined stages in the delivery process. Advantageously, the dispatch center 14 may maintain an accurate record of the delivery status without being overwhelmed with periodic or continuous updates that do not contain any useful information because data is transmitted to the dispatch center only upon the occurrence of a transmission event, and only that data and/or sensor data associated with the transmission event is transmitted.

According to an aspect of the invention, the processor may then return to block 42 and continue to read the sensor data at predetermined intervals. Advantageously, this process allows a complete record to be maintained at the delivery vehicle 14 containing the sensor data for the delivery vehicle 10 as well as the data associated with the occurrence of transmission events. This record insures that a complete and accurate profile is kept at all stages of the delivery process. Advantageously, this data may be stored on the computing device 24 or memory device 35 associated with the delivery vehicle 10 so that the dispatch center 14 is not burdened with maintaining and processing routine data updates. It will also be appreciated that this process enables the complete record of the delivery process to be downloaded and archived on a separate database remote from the delivery vehicle that may contain the delivery information for a number of delivery vehicles, such as a database located at the dispatch center. This enables the delivery information to be analyzed to determine performance variations among the vehicles, anomalies in the delivery process, the performance of specific equipment on the delivery vehicles, and the quality of a particular delivery. For example, if one of the status sensors 20 is configured to measure the engine temperature, that data can be analyzed to determine if a particular vehicle has consistently been operating at a temperature higher than other comparable vehicles. By identifying such patterns or anomalies, the dispatch center 14 can take appropriate preventive action to ensure that all vehicles in the fleet are operating at optimal conditions.

Another advantage of the present invention is that the transmission events keep the dispatch center 14 apprised of the status of the delivery, but do not provide excessive information or consume excessive bandwidth during the transmission process. Thus, the dispatch center 14 is provided with real-time status updates that can be tracked for multiple vehicles. Advantageously, this information can also be stored in a searchable database that enables users to find out the status of a particular delivery vehicle 10 or of a group of vehicles assigned to a particular client site 12. This information may also be made available over the Internet by providing an Internet-based user interface (such as an Internet web page) that allows users, such as clients, to search the database containing the delivery status information. Internet access to the database may also be restricted by requiring that users enter a password. Alternatively, a separate network may provide clients with access to the database using a secure connection. Advantageously, this enables clients to track the delivery of their materials without necessitating that they contact the dispatch center.

In accordance with another aspect of the invention, the dispatch center 14 is also capable of remotely pinging the computing device 24 on the delivery vehicle 10 to request that the most recent sensor data and any event data be transmitted. This may be accomplished by defining a transmission event that instructs the processor 30 to transmit the data in response to a particular signal received by the communications device 26. Thus, if dispatch center 14 desires current information about a particular delivery vehicle or vehicles, it then can ping the delivery vehicle to obtain a record of the most current information.

It will be recognized that this system provides a robust means for automatically tracking, monitoring, and reporting information concerning the delivery status of a delivery vehicle while transporting materials between a provider site 8 and a client site 12.

The present invention will now be described in more detail with respect to a preferred embodiment of the present invention with general reference to FIGS. 1–3. In this embodiment, the delivery vehicle 10 is a concrete delivery mixing truck equipped with associated status sensors 22 (described in detail below). The communications device 26 is preferably a radio modem connected to the communications interface 34. In this embodiment, the concrete delivery mixing truck contains three means for adding water to the concrete mixing drum. First, a driver push-button is provided that allows the driver to manually add water to the mixing drum by pushing the button. Second, the concrete mixing truck contains a water hose that may be used to manually add water to the mixing drum. Third, the concrete mixing delivery truck contains an auto-slumper 7 that monitors the slump of the concrete mixture and automatically adds liquid or other material to the mixture to achieve a desired slump as is well-known in the art. An example of an auto-slumper 7 is described in detail in U.S. Pat. No. 5,713,663 to Zandberg et. al, the disclosure of which is incorporated herein by reference. The auto-slumper 7 preferably contains a solenoid valve that is normally closed and prevents the flow of water into the mixing drum. In one embodiment of the present invention, the program logic used to control the auto-slumper 7 is stored on the computing device 24.

Preferably, the concrete delivery truck also contains a water tank valve and a water lock valve. The water tank valve is used to control the air pressure in the water tank. A normally closed solenoid valve is used to hold back the air pressure. The water lock valve is used to lock out control of the driver added water, thus preventing the driver from manually adding water either with the push-button or the hose. The water lock valve does not, however, impede the auto-slumper 7 from adding water to the mixing drum.

The concrete delivery mixing truck may also be equipped with numerous status sensors that provide data useful in tracking the status of the concrete delivery and of the concrete mixture in the concrete mixing truck. The following is a brief discussion of several examples of status sensors that may be included in a preferred embodiment. Although the status sensors are described in functional terms, it will be understood that each sensor may be implemented in a variety of different ways without altering the novel aspects of the present invention. The particular technology necessary to implement the status sensors is well known to those of skill in the art.

An IN SERVICE status sensor may be used to determine whether the concrete mixing delivery truck is in operation. The sensor senses the vehicle key switch for the truck engine and sets a status flag to indicate either ON or OFF.

A DRUM COUNTER status sensor may be used to monitor the number of drum revolution of the mixing drum using a single sensor and two target points. Each time the two target points are reached, the sensor records a drum revolution.

A WATER COUNTER status sensor may be used to monitor and record the amount of water added to the drum both manually using either the driver push-button or the hose and automatically using the auto-slumper 7.

A DRIVER ADDED status sensor may be used to determine whether the truck driver has manually begun adding water to the mixing drum using a built-in push-button feature. It is used by the WATER COUNTER status sensor to determine whether the water was added manually or by the auto-slumper 7.

A CHARGE PRESSURE status sensor may be used to measure the drum rotational pressure of the concrete mixing drum in the forward direction.

A DISCHARGE PRESSURE status sensor may be used to measures the drum rotational pressure of the concrete mixing drum in the reverse direction.

An AIR PRESSURE status sensor may be used to measure the air used for truck's brakes and the water tank.

A WATER TEMPERATURE status sensor may be used to measure the coolant temperature of the truck's engine.

A OIL PRESSURE status sensor may be used to measure the oil pressure of the truck's engine.

A BATTERY VOLTS status sensor may be used to measure the battery charging system for the truck.

A GPS RECEIVER status sensor may be used to determine the geographic location of the truck. As described above, the GPS RECEIVER receives data from a Global Positioning System satellite that enables the computing system to determine the truck's geographic location. Alternatively, the Global Positioning System RECEIVER may contain built in logic that automatically determines the geographic location. The computing device 24 can then simply read the data from the GPS RECEIVER.

In a preferred embodiment, each of these status sensors is monitored by the monitoring and reporting program 33. This may be achieved in numerous ways but is preferably achieved by automatically feeding data from each status sensor 22 into a system board associated with the computing device 24. The computing device then reads and preferably stores the sensor data for each of the status sensors 22 at predetermined intervals as described above. In one embodiment, the computing device outputs the sensor data to one or more display devices 25 associated with the delivery vehicle. The display device 25 may be a computer monitor, LCD display, portable computer, handheld device, or any other device capable of displaying the delivery data.

The computing device also continually monitors and processes the sensor data obtained from the status sensors 22 to determine whether a transmission event has occurred. The following is a brief explanation of several exemplary transmission events based on data received from the status sensors described above in accordance with this embodiment of the invention. Each of the following transmission events are preferably defined using computer program logic and could be implemented by a person of ordinary skill in the art. In a preferred embodiment the steps required to determine whether the transmission event has occurred are DOS commands that are processed by the processor 30 of the computing device 14. Numerous other computer program logic means may also be used without altering the novel aspects of the present invention.

The IN SERVICE transmission event occurs if the data read from the IN SERVICE status sensor indicates that the truck engine is ON and remains on for more than fifteen seconds. This event is used to determine when the truck is operational.

The LOADING transmission event requires that the computer monitor and interpret the data from the GPS RECEIVER, DRUM COUNTER, and CHARGE PRESSURE status sensors. First, the computing device 24 must determine the geographic location of the vehicle by reading data from the GPS RECEIVER (preferably the latitude and longitude to the second decimal place). If the geographic location of the truck is the same as a predefined geographic location of the provider site 8, the computing device 24 sets a status flag indicating that the truck is at the provider. The LOADING event occurs if: (1) the geographic location of the truck remains stable for a preset period of time (preferably 30 seconds); (2) the drum speed is measured at greater than a preset number of revolutions per minute (preferably 8) and remains greater than a preset number for a predetermined number of revolutions (preferable 20); and (3) the pressure reading is greater than a preset value (preferable 735). These conditions indicate that the truck is at the provider site 8 being loaded with the concrete mixture.

The LEAVE PLANT transmission event is determined by comparing the data read from the GPS RECEIVER with predefined values corresponding to the geographic locations of one or more provider sites 8. If the computing device 24 determines that the geographic location of the truck is different from each of the preset provider locations, the LEAVE PLANT transmission event occurs. This event indicates that the truck has left the provider 8 and is en route to the client site 12.

The ARRIVE JOB transmission event occurs when the data read from the GPS RECEIVER matches a predefined value corresponding to the geographic location of the client site 12 and remains stable for a preset time period (preferably 30 seconds). This event indicates that the truck has arrived at the client site 12.

The BEGIN POUR transmission event occurs when the ARRIVE JOB transmission event has already occurred (as indicated by a status flag set upon the occurrence of the ARRIVE JOB event) and the data read from the DRUM COUNTER status sensor indicates that a reverse drum rotation has occurred. This event indicates that unloading of the concrete mixture has begun at the client site 12.

The FINISH POUR transmission event occurs after the BEGIN POUR event when: (1) the data read from the DRUM COUNTER sensor indicates that a preset number of reverse drum revolutions (preferably 8) have occurred; (2) the data read from the CHARGE PRESSURE status sensor indicates a charge pressure in the forward direction of greater than a preset value (preferably 350); and (3) the data read from the WATER COUNTER status sensor indicates that a preset amount of water was discharged manually from the hose attached to the truck (preferably 5 gallons). This event determines whether the activities associated with the completion of the unloading of the concrete mixture have occurred, indicating that the concrete mixture has been delivered.

The LEAVE JOB transmission event occurs when the data read from the GPS RECEIVER no longer matches a predefined value corresponding to the geographic location of the client site 12. This event indicates that the truck has departed the client site 12.

The ARRIVE PLANT transmission event is determined by comparing the data read from the GPS RECEIVER status sensor with predefined values corresponding to the geographic locations of one or more provider sites 8. If the computing device determines that the geographic location of the truck is the same as one of the predefined geographic locations of the provider sites 8, the ARRIVE PLANT transmission event occurs. This event indicates that the truck has arrived at the provider site 8.

Upon the occurrence of any of the transmission events described above, the computing device processes computer program logic associated with the event. In a preferred embodiment, each event is associated with computer program logic from the monitoring and reporting program 33 that contains the instructions to be followed in response to the occurrence of an event. In a preferred embodiment, the monitoring and reporting program instructs the processor to set a status flag indicating that the event has occurred. The monitoring program also collects and stores event data associated with the event. The event data may comprise a record of the sensor data read from one or more status sensors, and/or derived measurements calculated from data read from one or more of the status sensors. For example, the event data may comprise the slump of the concrete mixture calculated from data read from the CHARGE PRESSURE status sensor as is well known in the art. It is also preferable that the processor reads and stores the sensor data read from all of the status sensors upon the occurrence of a transmission event. According to one aspect of the invention, the computer program logic associated with the event (and preferably included in the monitoring and reporting program) instructs the processor 30 to transmit the event data to the dispatch center 14.

Those of skill in the art will appreciate that the transmission events described above allow the dispatch center 14 to track the status of the concrete delivery. Advantageously, the dispatch center 14 is notified only when one of the transmission events occurs, thus minimizing the amount of information that must be sorted and interpreted by the dispatch center 14 and minimizing costs associated with excessive transmissions. When a delivery proceeds according to schedule, the dispatch center 14 receives updates at every stage of the delivery and is thus filly apprised of the status of the delivery.

Advantageously, transmission events may also be defined to indicate problems that may arise during the delivery process. In these circumstances, the transmission events serve as “alarms” that notify the dispatch center 14 of irregularities in the delivery or problems with the delivery vehicle 10 or concrete mixture. The alarms are defined using the computing device 24 to monitor the status sensors 22 to determine whether certain conditions are outside of predefined operational parameters, whether certain events have occurred out of sequence, or whether errors have occurred on the system board. The following paragraphs detail several examples of transmission events defined to serve as alarms.

The AIR PRESSURE ALARM occurs when the data read from the AIR PRESSURE status sensor indicates that the air pressure has fallen below a preset value (preferably 40 lbs.) and is maintained for a predefined time period (preferably 3 seconds). The AIR PRESSURE ALARM is active only when the IN SERVICE status sensor indicates that the engine is running. When the air pressure returns within predefined acceptable limits, the alarm is reset and a new transmission event occurs to notify the dispatch center 14 that the problem has been corrected.

Similarly, the WATER TEMPERATURE ALARM occurs when the data read from the WATER TEMPERATURE status sensor indicates that the temperature has risen above preset acceptable limits (preferably 220 degrees) and is maintained for a preset time period (preferably 3 seconds). When the water temperature returns within predefined acceptable limits, the alarm is reset and a new transmission event occurs to notify dispatch that the problem has been corrected.

Likewise, the OIL PRESSURE ALARM occurs when the data read from the OIL PRESSURE status sensor indicates that the oil pressure has fallen below predefined operational limits (preferably 3 lbs) and is maintained for a preset time period (preferable 3 seconds).

The WATER METER ALARM is used to indicate that the WATER COUNTER and/or the water output system is malfunctioning. It occurs when the computing device is used to open the solenoid valve to allow water to be added to the mixing drum and the data read from the WATER COUNTER status sensor indicates that no water is being pumped. Advantageously, this alarm insures that all water being added to the mixing drum is properly measured.

The NO TICKET ALARM indicates that the computing device has not been loaded with the preset values for slump and load size. Normally these values are sent by the dispatch center 14 to the computing device 24 for each delivery and are commonly referred to as job tickets. The alarm occurs when the LEAVE PLANT event has occurred and the slump value and load size values are zero. Preferably, the event data associated with this event includes a request that the slump value and load size values be resent from the dispatch center 14.

The DISCHARGE ALARM indicates that the concrete mixture is being discharged accidentally or in discordance with the parameters of the delivery. This alarm occurs when the LEAVE PLANT or LEAVE JOB events have occurred, the data read from the DISCHARGE PRESSURE status sensor is greater than the data read from the CHARGE PRESSURE status sensor, and the data read from the DRUM COUNTER status sensor indicates that a reverse drum revolution has occurred.

It will be appreciated that the alarm transmission events detailed above are merely illustrative. Numerous other alarms may be implemented according to the present invention by installing the appropriate status sensors and providing the necessary computer logic defining the transmission event and the data associated therewith.

In addition, other transmission events may be defined to improve the efficiency of the delivery process. For example, a common problem with GPS systems is that the location of a particular client site may be inexact or even unknown. This is especially true where the client site is located in an undeveloped region that has not yet been extensively mapped. It will be understood that several of the transmission events described above rely on the accurate geographic location information obtained from the GPS RECEIVER 20. Advantageously, in accordance with one aspect of the present invention, a transmission event may be defined to correct the geographic location of the client site 12 when the information initially provided is incorrect or unavailable. This may be accomplished in numerous ways. One possible solution is to monitor the DISCHARGE ALARM event. It will be appreciated that this event will occur if the geographic location of the client site is inaccurate because the ARRIVE JOB event will not occur. However, computer program logic may be implemented to determine whether discharge continues for a preset period of time and the criteria for the BEGIN POUR and FINISH POUR events are satisfied (except for the fact that the ARRIVE JOB event has not occurred). The computing device 24 may be programmed to transmit event data containing information sufficient to identify the client site and the proper geographic location, as well as instructions requesting that the geographic location for the client site be updated. In this manner, all future deliveries to the client site will proceed normally because the ARRIVE JOB event will occur properly.

Although this transmission event is described in connection with the above example, it will be understood that the transmission event correcting the geographic location of a client site will be useful in numerous other delivery systems. For example, the present invention may also be implemented on a delivery truck that is equipped with status sensors that monitor the weight of the load on the truck. A transmission event may then be defined to occur when the weight of the truck changes. If the weight of items loaded on the truck is known, then the transmission event may even be defined to indicate which items have been delivered by measuring the difference in weight that occurs when items are unloaded. As with the example above, a transmission event may also be defined to correct the geographic location of a client site by monitoring the delivery to determine if the delivery proceeded normally with the exception of the ARRIVE JOB event (or any similarly defined event serving the same function).

It will be recognized by those skilled in the art that a similar system of status sensors and transmission events can be implemented for virtually any delivery system to automatically track the status of the delivery and increase the efficiency of the delivery process.

Many modifications and other embodiments of the invention will come to mind to one skilled in the art to which this invention pertains having the benefit of the teachings presented in the foregoing descriptions and the associated drawings. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purpose of limitation.

That which is claimed:

1. A method for remotely monitoring and reporting the status of a delivery to a client site using a concrete delivery mixing truck comprising a plurality of associated status sensors communicatively connected to a computing device, the method comprising:

obtaining slump related data from one of the plurality of associated status sensors;

automatically monitoring the slump related data using the computing device;

determining whether a predefined transmission event has occurred based on calculating a slump value based on the slump related data, comparing the slump value to a delivery slump value, and indicating that a transmission event has occurred if a difference between the delivery slump value and the calculated slump value exceeds a tolerance level; and in response to the occurrence of the transmission event, automatically delivering event data associated at least in part with the transmission event to a predetermined location or device, wherein the event data comprises information indicating a status of the delivery.

2. The method of claim 1, further comprising displaying the slump value on a display device associated at least in part with the concrete delivery mixing truck.

3. The method of claim 1, wherein automatically delivering event data associated with the transmission event to a predetermined location or device comprises automatically delivering the slump value to a dispatch center associated with the concrete delivery mixing truck.

4. The method of claim 1, further comprising storing at least one of the slump related data and the event data in a memory device associated with the delivery vehicle.

5. The method of claim 4, further comprising manually initiating the transfer of at least one of the obtained sensor data and the event data from the memory device to a database remote from the delivery vehicle.

6. The method of claim 5, further comprising analyzing the database to validate the quality of a delivery.

7. A system for monitoring and reporting sensor data associated with the delivery of concrete from a provider site to a client site by a concrete delivery mixing truck, the system comprising:

a plurality of status sensors that collect sensor data associated with the concrete delivery mixing truck, wherein at least one of the plurality of status sensors is capable of obtaining slump related data;

a computing device communicatively connected to the plurality of status sensors, wherein the computing device reads sensor data from the plurality of status sensors at a predetermined interval;

a monitoring and reporting program associated with the computing device, wherein the monitoring and reporting program comprises at least computer program logic capable of: calculating a slump value based at least in part on the slump related data; comparing the slump value to a delivery slump value; and indicating that a slump related transmission event has occurred if a difference between the delivery slump value and the calculated slump value exceeds a tolerance level; and a communications device communicatively connected to the computing device, wherein the communications device receives event data from the monitoring and reporting program in response to the occurrence of a transmission event and delivers the event data to a remote location or device.

8. The system of claim 7, wherein the communications device transmits the slump value to a dispatch center in response to an occurrence of a slump related transmission event.

9. The system of claim 7, further comprising a display device associated with the delivery vehicle capable of displaying the slump value.

10. The system of claim 7, further comprising a memory device associated with the computing device, wherein the memory device stores at least one of the sensor data and the event data.

11. The system of claim 7, further comprising a database remote from the delivery vehicle that receives and stores at least one of the sensor data and the event data for later retrieval and analysis.

* * * * *